United States Patent Office 2,771,322
Patented Nov. 20, 1956

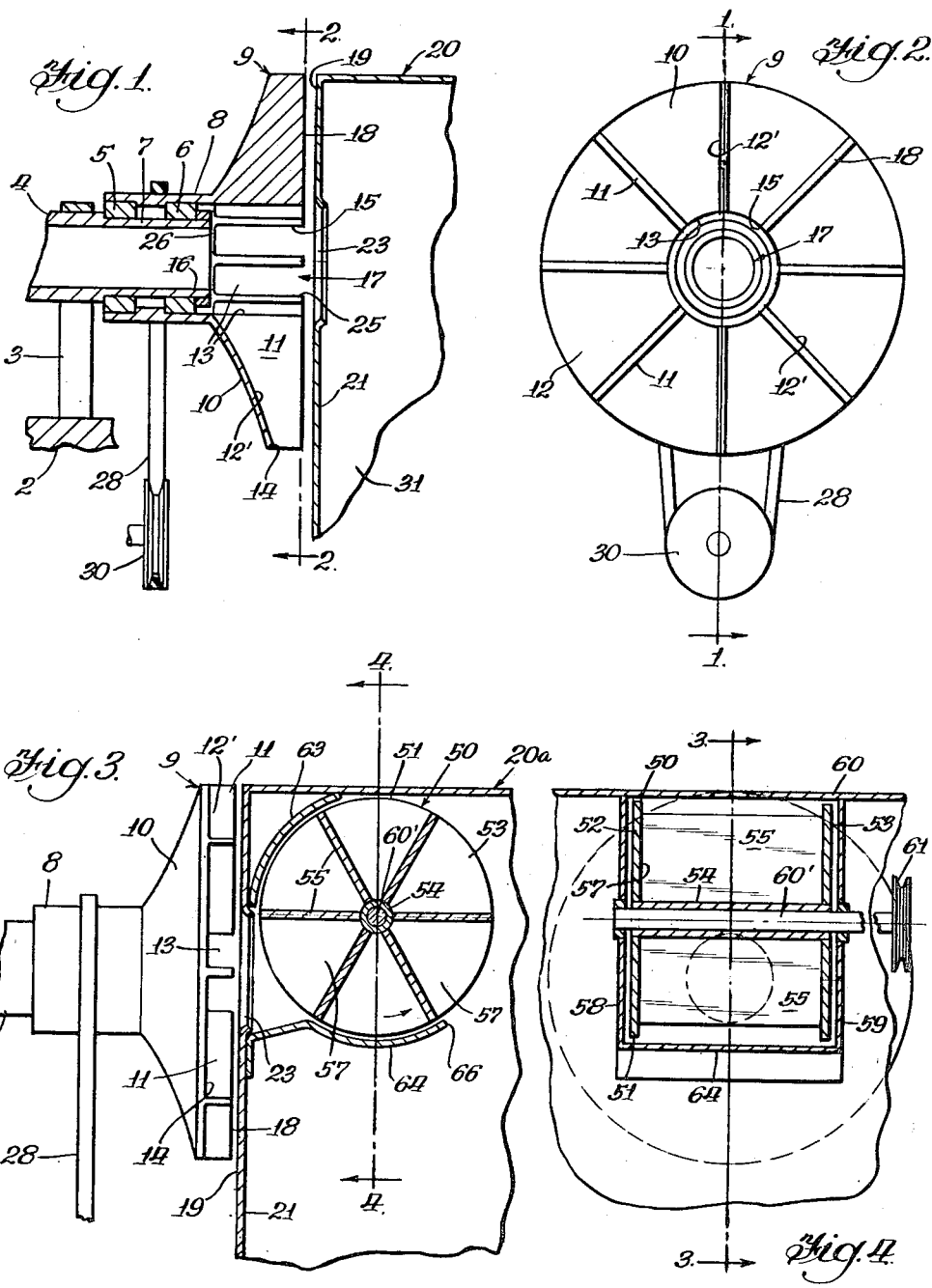

2,771,322

PNEUMATIC CONVEYOR FOR COTTON PICKERS

Ivan E. Sumey, Memphis, Tenn., assignor to International Harvester Company, a corporation of New Jersey Application August 26, 1955, Serial No. 530,783

10 Claims. (Cl. 302—37)

This invention relates to pneumatic conveyors of a type particularly adaptable for conveying cotton in cotton pickers although not necessarily restricted thereto.

A general object of the invention is to provide a novel and efficient pneumatic cotton conveyor wherein the cotton is conveyed through a tube and deposited in a receptacle without contact with the fan blades of the fan associated with the conveyor.

One of the disadvantages of the present pneumatic conveying systems of current production cotton pickers is that at times the cotton is brought into contact with the fan blades which rotate at extremely high velocities and strike the cotton with such impact that they shatter the seeds and this results in a deleterious effect on the cotton in staining it so that the cotton in downgraded.

A more specific object of the invention is to provide a novel conveying system wherein the material is passed through the eye of the fan rotor and the inertia of material propels the material through the fan into an associated receptacle.

These and other objects of the invention will become more apparent from the specification and drawings, wherein:

Figure 1 is an axial sectional view through the mechanism and a cross sectional view through the receptacle taken substantially on line 1—1 of Figure 2;

Figure 2 is a view taken substantially on the line 2—2 of Figure 1; and

Figures 3 and 4 show a modification of the invention, Figure 3 being a view essentially similar to that in Figure 1 except that the fan is shown in side elevational view, the sectional portion being taken substantially on the line 3—3 of Figure 4; and, Figure 4 being a sectional view taken substantially on the line 4—4 of Figure 3.

Describing the invention in detail and having reference first to the embodiment illustrated in Figures 1 and 2, there is shown a support 2 which includes a standard 3 conventionally supporting a pipe or duct 4 through which the cotton is adapted to pass. The pipe 4 is herein shown as disposed in a substantially horizontal position although, of course, it may be vertically or otherwise disposed. The pipe 4 is shown as carrying a plurality of bearings 5 and 6 externally on its outlet end portion 7, the bearings 5 and 6 rotatively supporting a surrounding hub 8 suitably interlocked with the bearings 5 and 6 as by a shoulder on hub 8.

The hub 8 is formed integral with the fan generally designated 9 which comprises a bell-shaped generally radially outwardly extending disk like side or wall member 10 which is formed integral with the hub 8. The bell-shaped member or web 10 is provided with a plurality of circumferentially spaced, radially extending blades 11 which project widthwise axially outwardly from the side 12 of wall 10 and with adjacent blades form an air chamber or blower passage 12' therebetween providing an inlet 13 at the inner periphery of the fan and a circumferentially widened outlet 14 at the outer periphery of the fan which compensates for the reduction in axial depth of the outlet with respect to the inlet which is elongated axially of the fan. It will be seen that the inner extremities 15 of the fan blades or impellers 11 terminate radially outwardly of the inner periphery 16 of the conveyor tube 4 and that the inner peripheries or edges 15 of the blades 11 collectively define an eye 17 which extends axially of the fan 9 and disposed coaxial with the pipe 4. It will be observed that the edges 18 of the blades 11 remote from the sidewall 10 are substantially radial and that they oppose a substantially flat outer surface 19 of a paralleling wall 21 of a container generally indicated 20. It will be understood that the surface 19 is disposed in close proximity to the edges 18 so that the surface 19 as well as the wall 10 of the fan and the blades 11 collectively define the chambers or the centrifugal blower passages 12 whereby the air, in which is entrained the cotton passing through the tube 4, is drawn through the inlets 13 through the passages 12 and exhausted through the outlets 14.

The wall 21 of the container 20 is provided with an inlet opening 23 which is coaxial with the eye 17 and in receiving relationship to the discharge end 25 thereof, it being understood that the inlet end 26 of the eye is disposed in receiving relation to the extremity 7 of the pipe 4.

It will be understood that the container 20 is a closed vessel so that upon initiating operation of the fan by its rotation through an associated power source, which is herein shown as a V-belt 28 trained over the hub 8 and driven from a driving pulley 30, the fan will initially exhaust the interior 31 of the container 20 and maintain the interior at subatmospheric pressure while at the same time sucking up the air through the pipe 4 with the entrained cotton therein. It will be understood that the cotton which is moving in an axial direction with respect to the fan will, because of its inertia mass, continue in a trajectory generally axially of the fan entering into the inlet 26 of the eye 17 and exhausting through the outlet 25 of the eye and into the container opening 23 and inasmuch as the container 20 is evacuated there is practically no counter air current moving out of the container into the fan and therefore the cotton will drop gravitationally into the bottom of the container.

Referring now to the embodiment shown in Figures 3 and 4 it will be noted that the fan structure and the container arrangement are substantially identical with that shown in the previous embodiment and therefore common parts will not be described inasmuch as they operate in exactly the same manner and are therefore identified by the same reference numerals.

In the present embodiment, however, the container generally indicated 20a is not intended to be completely evacuated by the fan but at the opening 23 is provided with an auxiliary receiver generally indicated 50 which comprises a drum 51 which includes a pair of side plates 52 and 53 connected to opposite ends of an axially extending support tube 54 therebetween. The side plates 52 and 53 are interconnected by a plurality of radial panels which at their inner peripheries are connected to the tube 54 and at their outer peripheries terminate adjacent to the outer peripheries of the annular side plates 52 and 53 and divide the drum 50 into a plurality of circumferentially spaced compartment 57. The drum 50 is journalled from a pair of side walls 58 and 59, which are formed integral with the top wall 60 of the container, 20a, by means of a shaft 60' which is journalled on bearings carried by the walls 58 and 59, the shaft 60 being suitably connected as by welding or a key to the tube 54 and externally of the wall 59 carrying a sheave 61 which is suitably connected to an associated power source as will be readily evident to those skilled in the art. It will be seen from a consideration of Figure 3 that the drum 50, which is positioned crosswise of the opening 23, is shielded in an area adjacent to the opening 23 by top and bottom shield members 63 and 64 which interconnect with the walls 58 and 59 and have corresponding edges connected to the wall 21 of the container 20a about its opening 23. It will be thus realized that the drum 50 presents a series of receptacles open and in receiving relationship to the opening 23, said receptacles 57 being readily evacuated by the fan 9 as the drum 50 is rotated slowly so that the chambers 57 are sequentially positioned in receiving relationship to the opening 23 and discharged over the trailing edge 66 of the bottom confining wall 64 into the receptacle 20a.

It will be readily appreciated that there will be a slight leakage of air, however, the amount exhausted from the container 20 or 20a will be of such inconsequential magnitude in proportion to the inertia of the cotton that the cotton will have entered into the containers without having been sucked out into the fan.

What is claimed is:

1. A pneumatic conveyor comprising a tubular duct having an outlet end portion, a rotor structure including an eye disposed in axial alignment with said end portion and having one end located in receiving relation to said duct for drawing material entrained air from said duct, a closed receptacle communicatively associated with the opposite end of said eye for receiving material moving through said eye, and said rotor structure having a plurality of blades formed and arranged to provide radial blower passage through said rotor and having inlets communicating with said eye about the periphery thereof and outlets about the outer periphery of said rotor.

2. A conveyor according to claim 1 and wherein said rotor comprises a plate-like member at one side to which said blades are connected along one of their radial edges and said blades presenting generally coplanar radially extending free edges remote from said member, and said container having a wall disposed in close generally paralleling opposing relation to said free edges.

3. The invention according to claim 2 and said member being substantially bell-shaped and flaring toward said wall and said blades extending lengthwise generally radially and widthwise axially from said member toward said wall and defining said inlets and said outlets and said inlets being narrow and elongated axially of the rotor and said outlets being narrow and elongated circumferentially of the rotor.

4. A pneumatic conveyor comprising a tubular conduit for channeling material entrained air having an outlet end, a fan rotor mounted at said end and having an eye positioned in extension of said conduit and having radial blower passages with inlets communicating with said eye and outlets about its outer periphery, and an enclosed container adapted to be maintained at subatmospheric pressure having an opening communicatively positioned in receiving relation with the end of said eye remote from said conduit.

5. The invention according to claim 4 and said container comprising a compartmentalizing instrumentality selectively positioning different portions of said receptacle into receiving relation with respect to said opening.

6. The invention according to claim 4 and a drum positioned athwart said opening in said container and having a plurality of circumferentially spaced compartments, and means for driving said drum to sequentially dispose said compartments in receiving relation to said opening and then in dumping relation to a receptacle associated therewith.

7. A fan rotor comprising a center portion defining an eye having an inlet and an outlet at opposite sides of the rotor, a structure extending outwardly from said center portion and including a radial web having an outer peripheral portion spaced from said eye, and blades connected to said web and extending from said eye to adjacent said outer periphery of the web, said blades and web formed and arranged to define blower passages having inner and outer ends and of substantially constant volumetric dimension from said inner to said outer end, and said passages at one of said ends being narrow circumferentially of the rotor and elongated axially of the rotor and the other of said ends being elongated circumferentially of the rotor and narrow axially of the rotor.

8. A pneumatic conveyor comprising a duct having an outlet end portion, a rotor structure including an eye having one end in receiving relation to the duct for drawing material entrained air therefrom, a receptacle formed and arranged to be maintained under a pressure differential with respect to the duct and communicatively associated with the opposite end of said eye for receiving material moving through said eye, and said rotor structure having a plurality of blades formed and arranged to provide blower passages through the rotor and having inlets communicating with said eye and outlets at the outer periphery of the rotor.

9. A rotor comprising a central portion including an eye having openings at opposite sides of the rotor, a bell-shaped radial member about said central portion, and circumferentially spaced blades connected to said member and extending lengthwise radially of the rotor and widthwise axially of the rotor, and defining inlets open to said eye and outlet about the outer periphery of the rotor, and said inlets being narrow circumferentially and elongated axially, and said outlets being narrow axially and elongated circumferentially.

10. The invention according to claim 9 and said member disposed at one side of said rotor and said blades terminating in free radial edges remote from said member, and a stationary element presenting a surface opposing said edges and having an opening therethrough communicating with an adjacent opening of said eye.

References Cited in the file of this patent

UNITED STATES PATENTS

| 149,114 | Grieser | Mar. 31, 1874 |
| 2,624,641 | Smith | Jan. 6, 1953 |

FOREIGN PATENTS

| 122,353 | Great Britain | Jan. 23, 1919 |